US012047015B2

(12) United States Patent
Shirouchi et al.

(10) Patent No.: US 12,047,015 B2
(45) Date of Patent: Jul. 23, 2024

(54) POWER CONVERTER AND AIRCRAFT EQUIPPED WITH POWER CONVERTER

(71) Applicant: Mitsubishi Electric Corporation, Tokyo (JP)

(72) Inventors: Yusuke Shirouchi, Tokyo (JP); Kenji Fujiwara, Tokyo (JP); Takayoshi Nagai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 104 days.

(21) Appl. No.: 18/008,695

(22) PCT Filed: Sep. 9, 2020

(86) PCT No.: PCT/JP2020/034055
§ 371 (c)(1),
(2) Date: Dec. 7, 2022

(87) PCT Pub. No.: WO2022/054155
PCT Pub. Date: Mar. 17, 2022

(65) Prior Publication Data
US 2023/0216431 A1 Jul. 6, 2023

(51) Int. Cl.
*H02M 1/32* (2007.01)
*B60L 53/20* (2019.01)
(Continued)

(52) U.S. Cl.
CPC ......... *H02M 7/53871* (2013.01); *B60L 53/20* (2019.02); *B64D 47/00* (2013.01); *B60L 2200/10* (2013.01); *B64D 2221/00* (2013.01)

(58) Field of Classification Search
CPC .. H02M 7/53871; H02M 1/32; H02M 1/0095; H02M 7/4835; H02M 7/487;
(Continued)

(56) References Cited

U.S. PATENT DOCUMENTS

| 5,789,779 A | 8/1998 | Arai et al. |
| 2004/0012983 A1 | 1/2004 | Fearing et al. |

(Continued)

FOREIGN PATENT DOCUMENTS

| JP | 8-186261 A | 7/1996 |
| JP | 2004-513596 A | 4/2004 |

(Continued)

OTHER PUBLICATIONS

International Search Report and Written Opinion mailed on Oct. 27, 2020, received for PCT Application PCT/JP2020/034055, filed on Sep. 9, 2020, 8 pages including English Translation.
(Continued)

*Primary Examiner* — Elim Ortiz
(74) *Attorney, Agent, or Firm* — XSENSUS LLP

(57) ABSTRACT

A power conversion device is provided between a power supply and a load, and converts power from the power supply and supplies the converted power to the load. The power conversion device includes a plurality of switching elements composed of semiconductor elements, and a control device which generates drive signals for controlling the plurality of switching elements. Voltages are respectively applied to the plurality of semiconductor elements, on the basis of the drive signals generated by the control device. The plurality of semiconductor elements have equivalent failure probabilities due to neutron beams. Thus, a failure of the power conversion device due to neutron beams is prevented, and size increase thereof is suppressed.

16 Claims, 14 Drawing Sheets

(51) Int. Cl.
  *B64D 47/00*   (2006.01)
  *H02M 7/483*   (2007.01)
  *H02M 7/49*    (2007.01)
  *H02M 7/537*   (2006.01)
  *H02M 7/5387*  (2007.01)

(58) Field of Classification Search
  CPC .. H02M 7/5388; B60L 53/20; B60L 2200/10; B60L 3/003; B60L 3/12; B60L 2210/40; B64D 47/00; B64D 2221/00; B64D 27/24
  See application file for complete search history.

(56) References Cited

U.S. PATENT DOCUMENTS

| | | |
  |---|---|---|
  | 2006/0145298 A1 | 7/2006 | Omura |
  | 2011/0089765 A1 | 4/2011 | Iwata et al. |
  | 2019/0152617 A1 | 5/2019 | Anton et al. |
  | 2022/0255457 A1* | 8/2022 | Kojima ................. H02M 1/325 |

FOREIGN PATENT DOCUMENTS

| | | |
  |---|---|---|
  | JP | 2006-166655 A | 6/2006 |
  | JP | 2007-166815 A | 6/2007 |
  | JP | 2017-221034 A | 12/2017 |
  | JP | 6682049 B1 | 4/2020 |
  | WO | 2009/116273 A1 | 9/2009 |

OTHER PUBLICATIONS

Akturk et al., "The Effects of Radiation on the Terrestrial Operation of SiC MOSFETs", IEEE international Reliability Physics Symposium, 2018, pp. 2B.1-1-2B.1-5.
  Extended European Search Report issued Sep. 29, 2023 in European Patent Application No. 20953221.7, 12 pages.
  Christian Felgemacher, et al., "Benefits of increased cosmic radiation robustness of SiC semiconductors in large power-converters", PCIM Europe 2016, May 10-12, 2016, XP093083530, 8 pages.

* cited by examiner

POWER CONVERTER AND AIRCRAFT EQUIPPED WITH POWER CONVERTER

CROSS-REFERENCE TO RELATED APPLICATION

The present application is based on PCT filing PCT/JP2020/034055, filed Sep. 9, 2020, the entire contents of which are incorporated herein by reference.

TECHNICAL FIELD

The present disclosure relates to a power conversion device and an aircraft provided with the power conversion device.

BACKGROUND ART

In recent years, an electrification system such as electric motor driving from an engine is increasingly spreading in electric vehicles, ships, and the like, and further, also for aircrafts, studies for electrification are being pursued worldwide in an attempt of reducing $CO_2$. For driving an electric motor, a power conversion device that supplies predetermined power to the electric motor is used. Such a power conversion device provided to an electric aircraft includes a power module or a semiconductor element, and is used under a high-altitude environment. Accordingly, it is known that the power module or the semiconductor element may suffer a single-event failure due to cosmic rays (neutron beams), and measures for preventing occurrence of the failure are required. In addition, for mounting to an aircraft, the power conversion device is required to have a small size and a light weight in terms of implementation and fuel efficiency.

In such circumstances, it is disclosed that a power conversion device is configured by a multilevel inverter, and application voltage to be supplied to the inverter is adjusted in accordance with the altitude, thereby preventing a single-event failure due to neutron beams (see, for example, Patent Document 1).

As an example of the multilevel inverter, a configuration in which a three-phase inverter and a single-phase inverter are connected in series, is known (see, for example, Patent Document 2).

In addition, it is known that a failure probability of a semiconductor element due to neutron beams has a correlation with the type of the semiconductor element and the application voltage (see, for example, Non-Patent Document 1).

CITATION LIST

Patent Document

Patent Document 1: Specification of US Patent application publication No. 2019/152617
Patent Document 2: WO2009/116273

Non-Patent Document

Non-Patent Document 1: Akin Akturk, James McGarrity, Neil Goldsman, Daniel J. Lichtenwalner, Brett Hull, Dave Grider, and Richard Wilkins, "The Effects of Radiation on the Terrestrial Operation of SiC MOSFETs", 2018 IEEE international Reliability Physics Symposium, pp. 2B.1-1 to 2B.1-5

SUMMARY OF THE INVENTION

Problems to be Solved by the Invention

In the technology disclosed in Patent Document 1, if an aircraft reaches an altitude exceeding a threshold, the application voltage is reduced, whereby a failure can be suppressed. However, as described in Patent Document 2, a power conversion device like a multilevel inverter has many semiconductor elements. Further, as disclosed in Non-Patent Document 1, the failure probability due to neutron beams from space differs also depending on the type of the semiconductor element, and therefore it is not easy to control the application voltage so that all the semiconductor elements will not fail. Meanwhile, if semiconductor elements are prepared with excessive withstand voltage ensured, the size and the weight of the power conversion device might be increased.

The present disclosure has been made to solve the above problem, and an object of the present disclosure is to provide a power conversion device in which a failure due to neutron beams is prevented while suppressing size increase of the device and achieving weight reduction.

Solution to the Problems

A power conversion device according to the present disclosure is a power conversion device which is provided between a power supply and a load, and which converts power from the power supply and supplies the converted power to the load, the power conversion device including: a plurality of switching elements each including a semiconductor element to be controlled by a drive signal; and a control device for generating the drive signals. Voltages are respectively applied to a plurality of the semiconductor elements, on the basis of the drive signals generated by the control device. The plurality of semiconductor elements include semiconductor elements for which failure probabilities due to neutron beams are different when the same voltage is applied thereto. The plurality of semiconductor elements have equivalent failure probabilities due to neutron beams with respect to the respective voltages applied thereto on the basis of the drive signals.

Effect of the Invention

The power conversion device according to the present disclosure makes it possible to prevent a failure due to neutron beams while suppressing size increase of the device and achieving weight reduction. In addition, an aircraft provided with the power conversion device can be improved in reliability and fuel efficiency.

DESCRIPTION OF EMBODIMENTS

Figure 1:
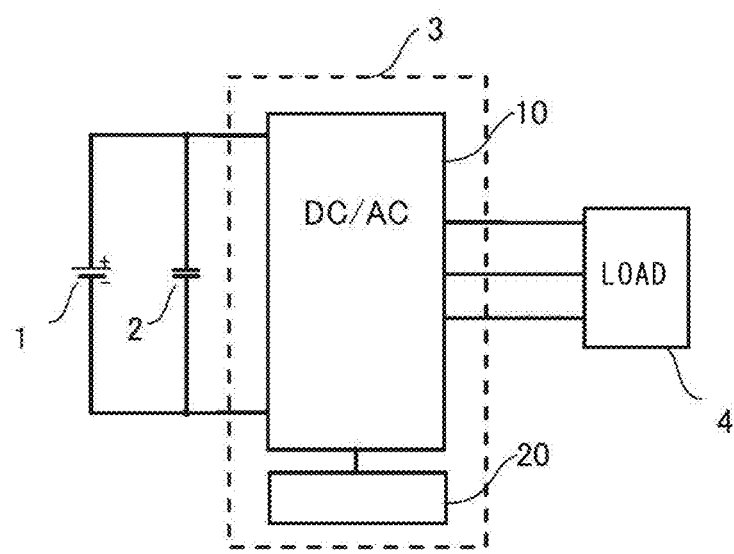
FIG. 1 is a schematic configuration diagram showing the configuration of a power conversion system according to embodiment 1.

Hereinafter, embodiments will be described with reference to the drawings. In the drawings, the same reference characters denote the same or corresponding parts.

Embodiment 1

Hereinafter, a power conversion device according to embodiment 1 will be described with reference to the drawings.

FIG. 1 is a schematic configuration diagram showing an example of a power conversion system using a power conversion device 3 according to embodiment 1. In FIG. 1, a DC link capacitor 2 and the power conversion device 3 are connected in parallel between a power supply 1 and a load 4. The power conversion device 3 includes an inverter 10 which is a power conversion unit for converting power from the power supply 1 which is a DC power supply to predetermined power and outputting the converted power to the load 4, and a control device 20 which is a control unit therefor. In embodiment 1, a case where the inverter 10 is a DC/AC inverter will be described as an example.

Figure 2A:
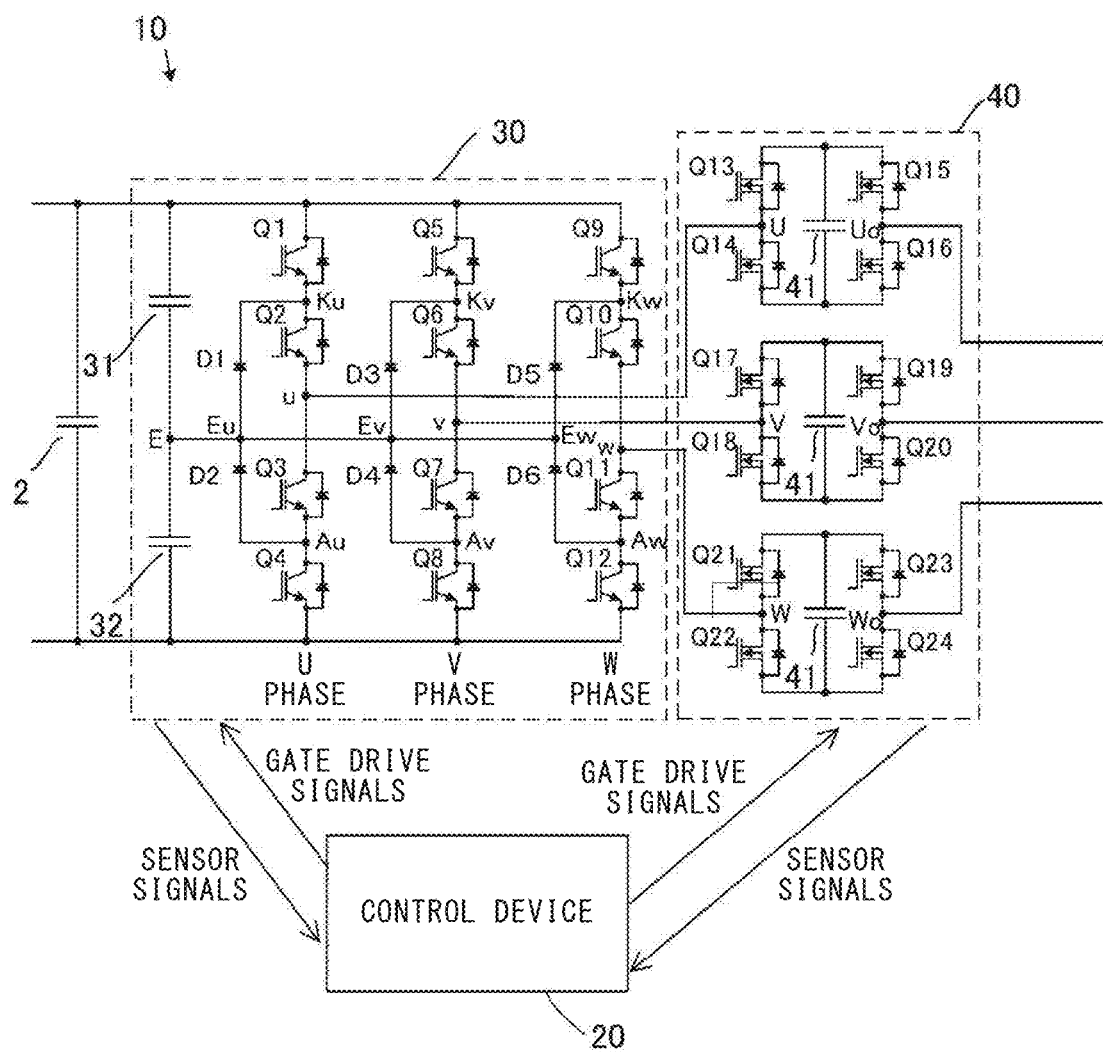
FIG. 2A shows an example of a circuit configuration of the power conversion device according to embodiment 1.
Figure 2B:
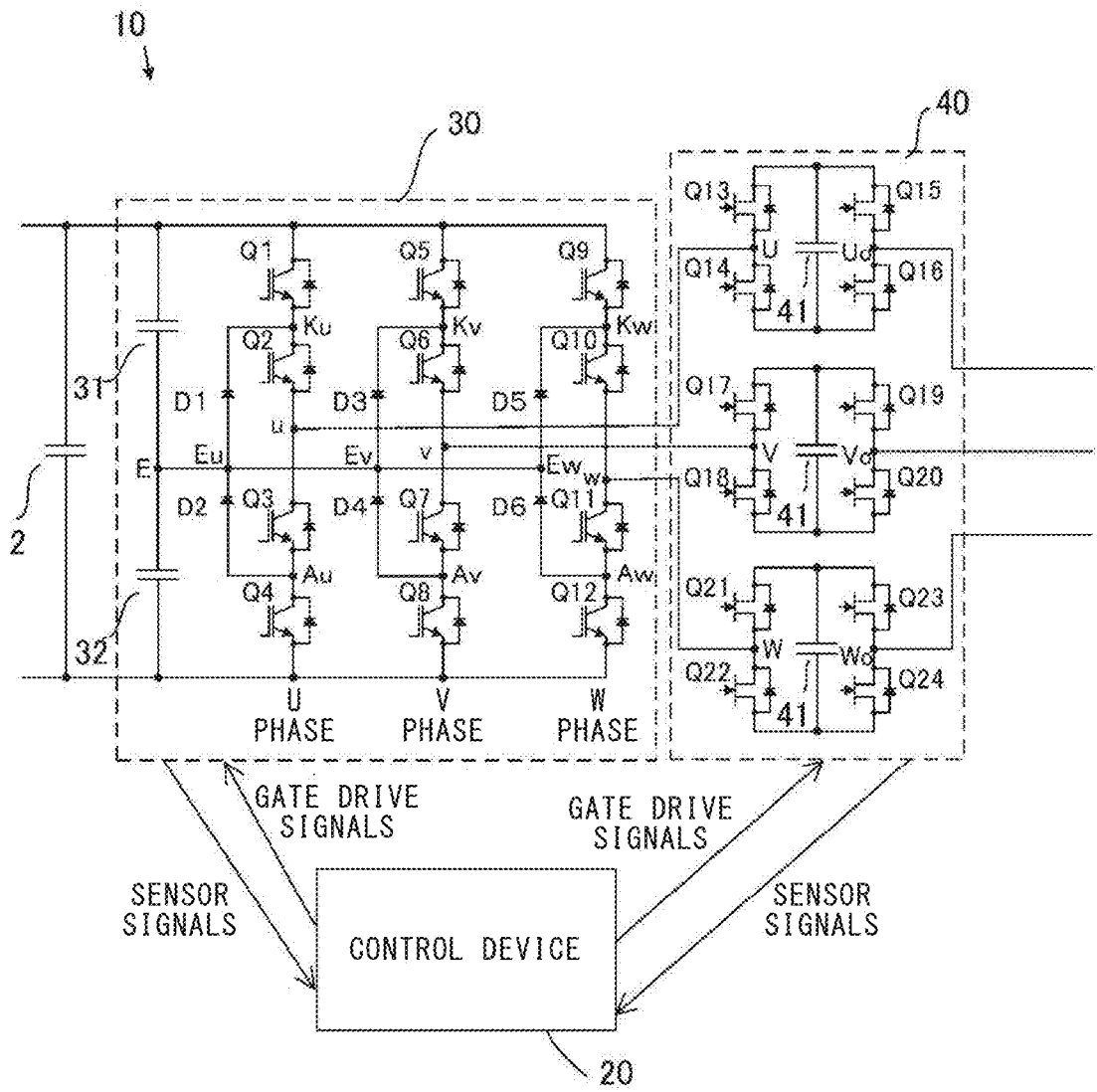
FIG. 2B shows another example of a circuit configuration of the power conversion device according to embodiment 1.

FIG. 2A and FIG. 2B show examples of a circuit configuration of the inverter 10. The DC/AC inverter 10 includes a three-phase three-level inverter 30 and a single-phase inverter 40.

In FIG. 2A, switching elements Q1 to Q12 composing the three-phase three-level inverter 30 are each formed by connecting a diode in antiparallel to an integrated gate bipolar transistor (IGBT) which is a semiconductor element, and switching elements Q13 to Q24 composing the single-phase inverter 40 are each formed by connecting a diode in antiparallel to a metal-oxide-semiconductor field-effect transistor (MOSFET) which is a semiconductor element, as an example. In FIG. 2B, as in FIG. 2A, switching elements Q1 to Q12 composing the three-phase three-level inverter 30 are each formed by connecting a diode in antiparallel to an IGBT which is a semiconductor element, and switching elements Q13 to Q24 composing the single-phase inverter 40 are each formed by connecting a diode in antiparallel to a high electron mobility transistor (HEMT) which is a semiconductor element, as an example.

Preferably, the switching elements Q1 to Q12 composing the three-phase three-level inverter 30 and the switching elements Q13 to Q24 composing the single-phase inverter 40 are all formed using a wide bandgap semiconductor. As described later in detail, in particular, the switching elements Q13 to Q24 composing the single-phase inverter 40 performs high-speed switching and therefore it is especially preferable to form these switching elements using a wide bandgap semiconductor.

The configuration of each of the switching elements Q1 to Q24 composing the three-phase three-level inverter 30 and the single-phase inverter 40 in FIG. 2A and FIG. 2B will be described with reference to FIG. 3A, FIG. 3B, and FIG. 3C.

Figure 3A:
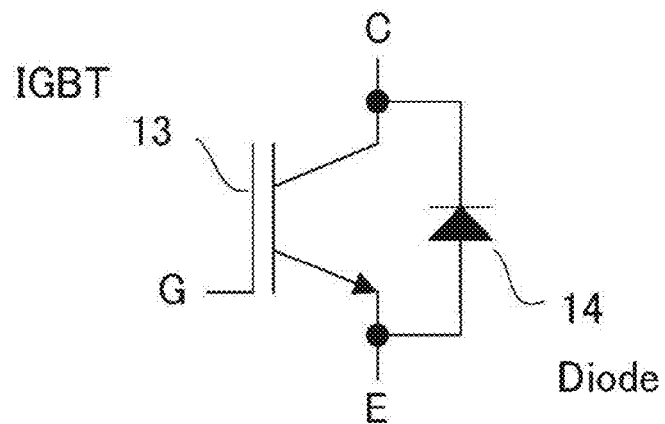
FIG. 3A shows an example of a switching element used in the power conversion device according to embodiment 1.

FIG. 3A shows an example of the configuration of the semiconductor element applied to the switching elements Q1 to Q12 composing to the three-phase three-level inverter 30, and the semiconductor element is composed of an IGBT 13 having a collector terminal C, a gate terminal G, and an emitter terminal E, and a diode 14 connected in antiparallel thereto. The IGBT 13 may be a Si-IGBT, or may be, for example, a SiC-IGBT using a wide bandgap semiconductor. The diode 14 may be a Si-diode, or may be, for example, a SiC-diode using a wide bandgap semiconductor.

Figure 3B:
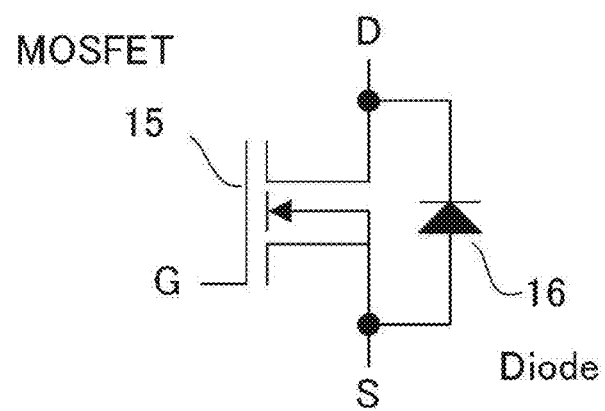
FIG. 3B shows another example of a switching element used in the power conversion device according to embodiment 1.

FIG. 3B shows an example of the configuration of the semiconductor element applied to the switching elements Q13 to Q24 composing the single-phase inverter 40, and the switching element is composed of a MOSFET 15 having a drain terminal D, a gate terminal G, and a source terminal S, and a diode 16 connected in antiparallel thereto. The MOSFET 15 may be a Si-MOSFET, or may be, for example, a SiC-MOSFET using a wide bandgap semiconductor. The diode 16 may be a Si-diode, or may be, for example, a SiC-diode using a wide bandgap semiconductor. However, it is desirable to form the semiconductor elements using a wide bandgap semiconductor.

Figure 3C:
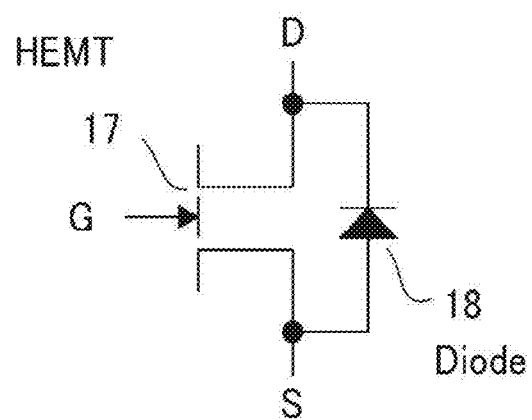
FIG. 3C shows still another example of a switching element used in the power conversion device according to embodiment 1.

FIG. 3C shows another example of the configuration of a semiconductor element applied to the switching elements Q13 to Q24 composing the single-phase inverter 40, and the switching element is composed of a HEMT 17 having a drain terminal D, a gate terminal G, and a source terminal S, and a diode 18 connected in antiparallel thereto. The HEMT 17 is, for example, a GaN-HEMT using a wide bandgap semiconductor. The diode 18 may be a Schottky barrier diode or a Si-diode, or may be, for example, a SiC-diode using a wide bandgap semiconductor. However, it is desirable to form the semiconductor elements using a wide bandgap semiconductor.

Next, with reference to FIG. 2A, the circuit configuration of the inverter 10 will be described.

In FIG. 2A, the three-phase three-level inverter 30 is configured such that a P-side capacitor 31 and an N-side capacitor 32 connected in series, the switching elements Q1 to Q4 connected in series, the switching elements Q5 to Q8 connected in series, and the switching elements Q9 to Q12 connected in series, are connected in parallel to the DC link capacitor 2.

A connection point E between the P-side capacitor 31 and the N-side capacitor 32 is connected to a connection point Eu between an anode terminal of a diode D1 and a cathode terminal of a diode D2, a connection point Ev between an anode terminal of a diode D3 and a cathode terminal of a diode D4, and a connection point Ew between an anode terminal of a diode D5 and a cathode terminal of a diode D6.

A cathode terminal of the diode D1 is connected to a connection point Ku between the switching element Q1 and the switching element Q2, a cathode terminal of the diode D3 is connected to a connection point Kv between the switching element Q5 and the switching element Q6, and a cathode terminal of the diode D5 is connected to a connection point Kw between the switching element Q9 and the switching element Q10.

An anode terminal of the diode D2 is connected to a connection point Au between the switching element Q3 and the switching element Q4, an anode terminal of the diode D4 is connected to a connection point Av between the switching element Q7 and the switching element Q8, and an anode terminal of the diode D6 is connected to a connection point Aw between the switching element Q1l and the switching element Q12.

A connection point u between the switching element Q2 and the switching element Q3, a connection point v between the switching element Q6 and the switching element Q7, and a connection point w between the switching element Q10 and the switching element Q11, are connected to the single-phase inverter 40.

The switching elements Q1 to Q4 connected in series form a leg for U phase, the switching elements Q5 to Q8 connected in series form a leg for V phase, and the switching elements Q9 to Q12 connected in series form a leg for W phase.

The single-phase inverter 40 is composed of bridge circuits each having four switching elements corresponding to each phase. That is, the single-phase inverter 40 includes a U-phase inverter in which the switching element Q13 and the switching element Q14 connected in series, the switching element Q15 and the switching element Q16 connected in series, and the capacitor 41 are connected in parallel, a V-phase inverter in which the switching element Q17 and the switching element Q18 connected in series, the switching element Q19 and the switching element Q20 connected in series, and the capacitor 41 are connected in parallel, and a W-phase inverter in which the switching element Q21 and the switching element Q22 connected in series, the switching element Q23 and the switching element Q24 connected in series, and the capacitor 41 are connected in parallel.

A connection point U between the switching element Q13 and the switching element Q14 is connected to the connection point u of the three-phase three-level inverter 30, a connection point V between the switching element Q17 and the switching element Q18 is connected to the connection point v of the three-phase three-level inverter 30, and a connection point W between the switching element Q21 and the switching element Q22 is connected to the connection point w of the three-phase three-level inverter 30.

A connection point Uo between the switching element Q15 and the switching element Q16, a connection point Vo between the switching element Q19 and the switching element Q20, and a connection point Wo between the switching element Q23 and the switching element Q24, are connected to the load 4.

The control device 20 receives sensor signals from current sensors (not shown) or voltage sensors (not shown) provided to the three-phase three-level inverter 30 and the single-phase inverter 40, and outputs gate drive signals for the switching elements Q1 to Q24 included in the three-phase three-level inverter 30 and the single-phase inverter 40, thus performing control so as to perform conversion to predetermined power.

Next, operation of the power conversion device 3 according to embodiment 1 will be described.

Figure 4A:
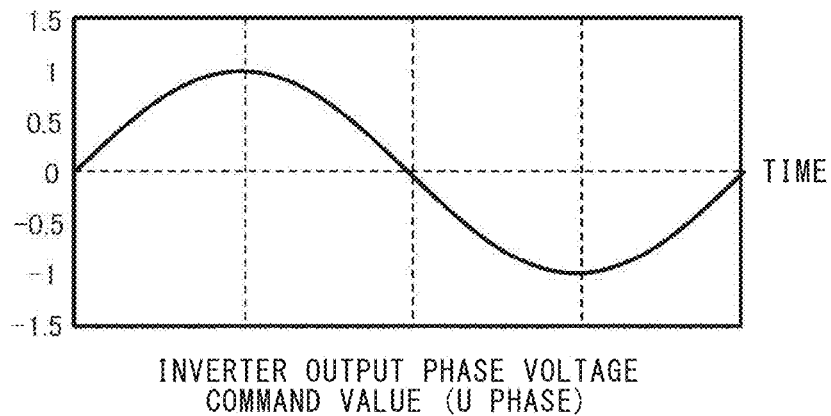
FIG. 4A shows an output command value in the power conversion device according to embodiment 1.
Figure 4B:
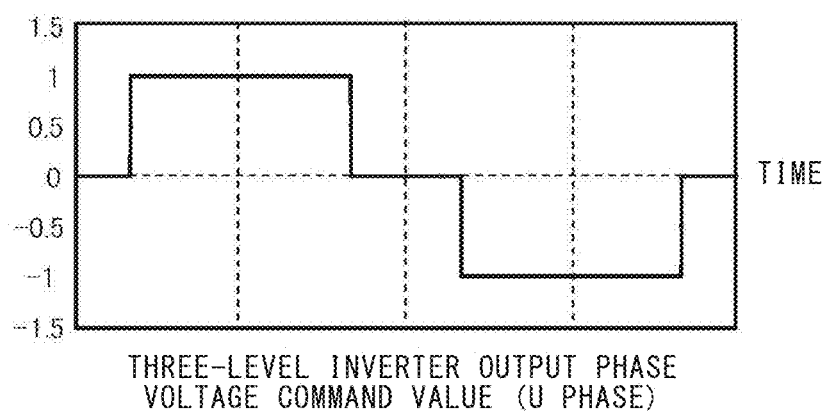
FIG. 4B shows an output command value for a three-phase three-level inverter in the power conversion device according to embodiment 1.
Figure 4C:
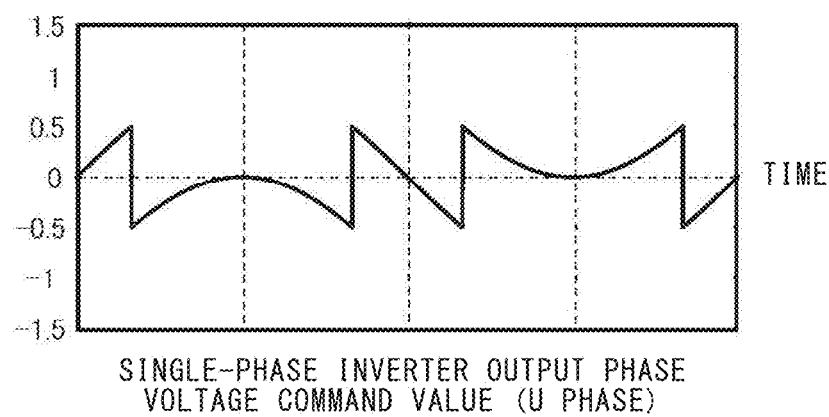
FIG. 4C shows an output command value for a single-phase inverter in the power conversion device according to embodiment 1.

FIG. 4A shows a target output voltage command value for the inverter 10, and shows an example for U phase. As shown in the graph, the output waveform is a sinewave. FIG. 4B shows an output voltage command value (U phase) for the three-phase three-level inverter 30, and the output waveform is a rectangular wave with one pulse. FIG. 4C shows an output voltage command value (U phase) for the single-phase inverter 40, and the waveform corresponds to a difference between the target output waveform in FIG. 4A and the output voltage command value for the three-phase three-level inverter 30 in FIG. 4B.

By the gate drive signals from the control device 20, the three-phase three-level inverter 30 and the single-phase inverter 40 output voltages in accordance with the output voltage command values having predetermined waveforms, respectively.

The three-phase three-level inverter 30 generates a waveform with one pulse through low-frequency switching operation, and the single-phase inverter 40 generates a voltage waveform with multiple pulses because the output voltage command value therefor has a waveform generated through pulse width modulation (PWM). Therefore, the voltage of each capacitor 41 of the single-phase inverter 40 is set to be smaller than voltages of the P-side capacitor 31 and the N-side capacitor 32 which are input capacitors of the three-phase three-level inverter 30. For example, if the voltage of each capacitor 41 is set to approximately ½ or ⅓ of the voltages of the P-side capacitor 31 and the N-side capacitor 32, it is possible to output a stable waveform having less harmonic components in PWM operation of the single-phase inverter 40.

The control device 20 calculates gate drive signals using sensor signals from the current sensors or the voltage sensors provided to the three-phase three-level inverter 30 and the single-phase inverter 40 so as to keep the relationship of the voltage ratio of the capacitors, and outputs the gate drive signals to the switching elements Q1 to Q24. As a result, the three-phase three-level inverter 30 generates a waveform with one pulse through low-frequency switching operation at high DC voltage, and the single-phase inverter 40 performs high-speed switching operation at low DC voltage.

Figure 5A:
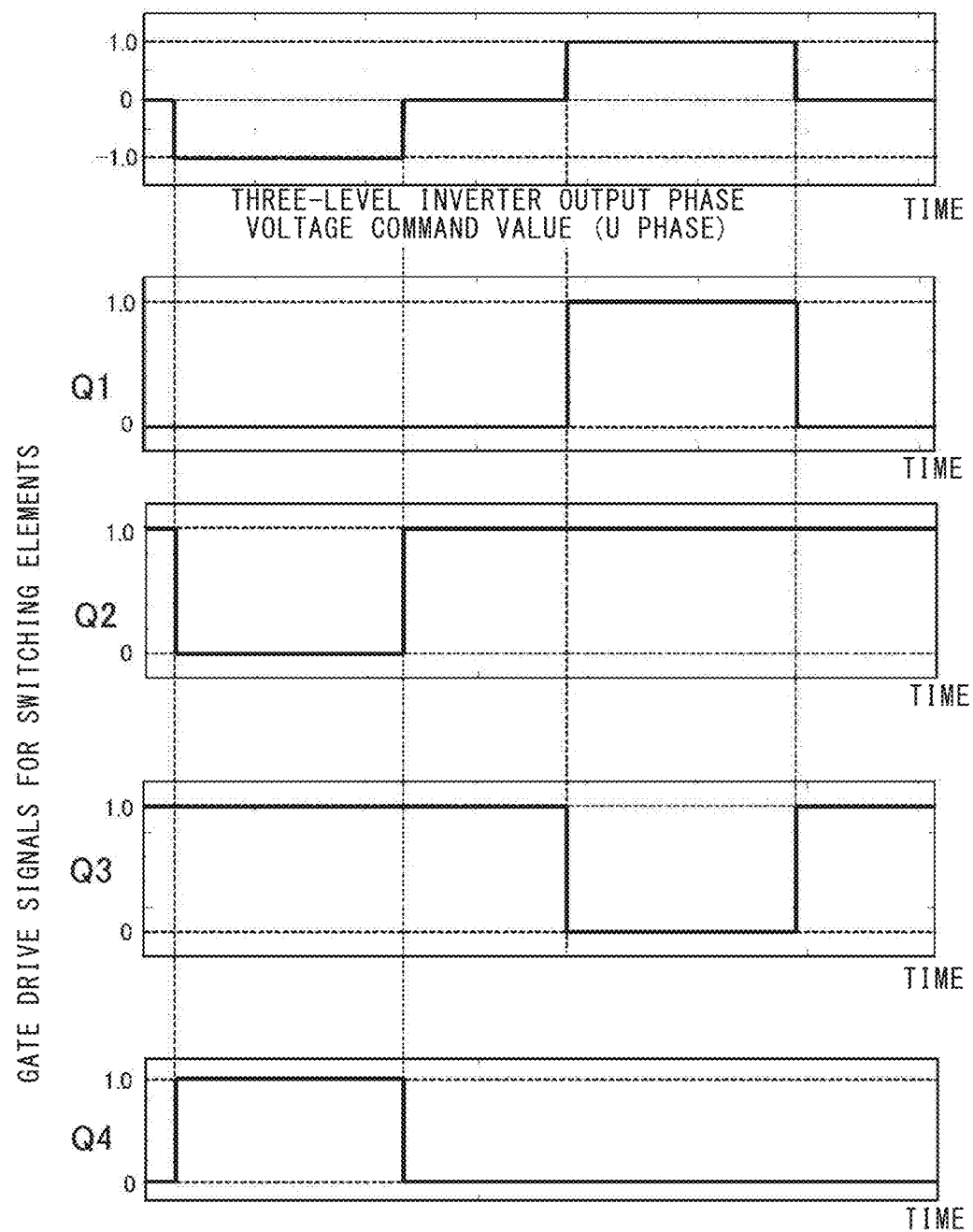
FIG. 5A shows gate drive signals for driving switching elements composing the three-phase three-level inverter in the power conversion device according to embodiment 1.

FIG. 5A shows the gate drive signals outputted to the switching elements in order to output the voltage waveform corresponding to the output voltage command value (U phase) for the three-phase three-level inverter 30. In FIG. 5A, from the upper side, the waveforms of the output voltage command value (U phase) for the three-phase three-level inverter 30 and the gate drive signals for driving the switching elements Q1 to Q4 composing the leg for U phase of the three-phase three-level inverter 30 are shown. Each of the switching elements Q1 to Q4 is switched ON and OFF once per cycle. Thus, the number of times of switching is small in the switching elements composing the three-phase three-level inverter 30, and therefore semiconductor elements such as Si-IGBT whose switching time (turn-on time and turn-off time) is long can be used. In this case, in a period in which the gate drive signal is OFF (i.e., 0), application voltage between the collector and the emitter of the semiconductor element becomes a voltage value of the P-side capacitor 31 or the N-side capacitor 32 which are input capacitors, and in a period in which the gate drive signal is ON (i.e., 1), the application voltage becomes 0 (in actuality, voltage corresponding to internal voltage drop is applied).

Figure 5B:
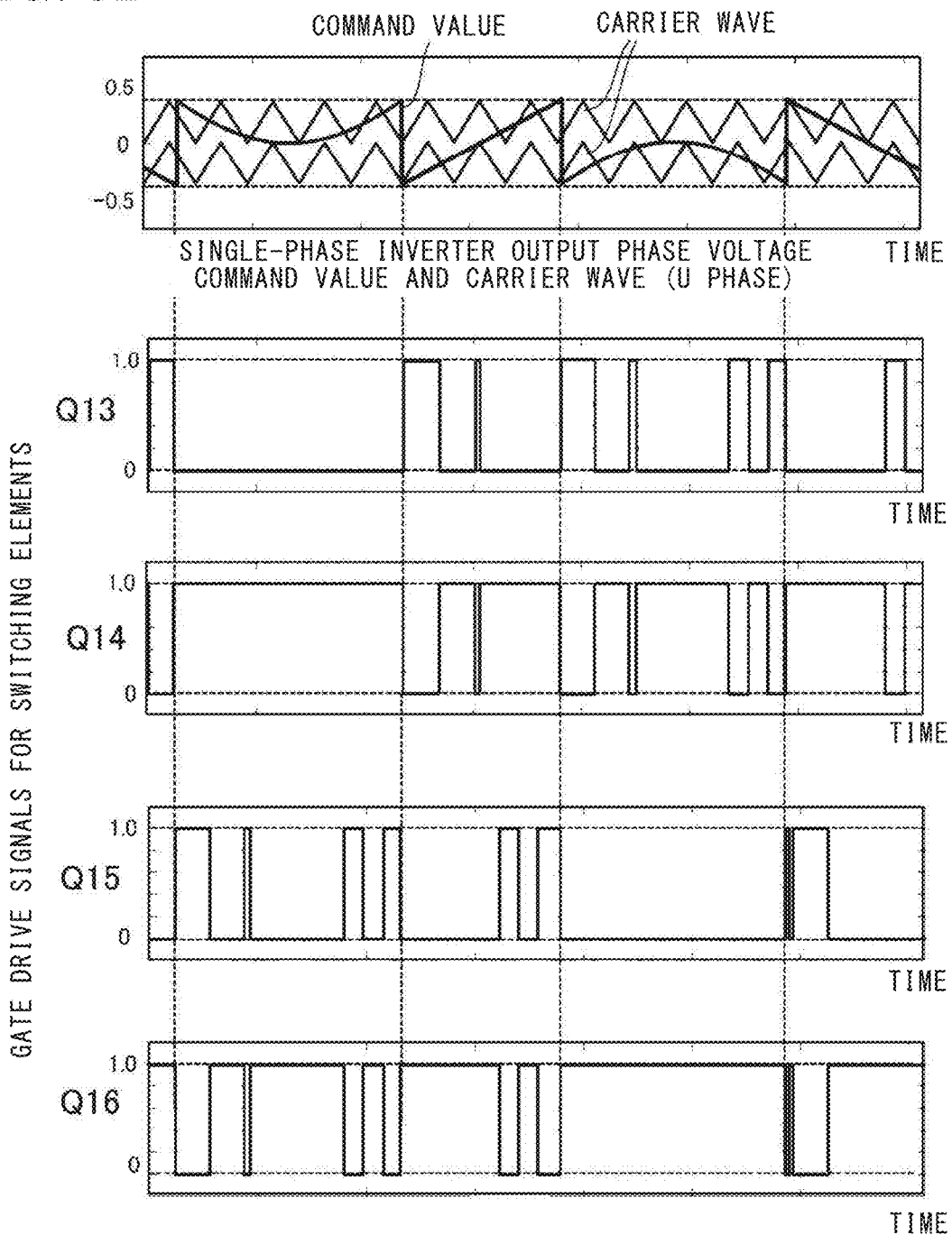
FIG. 5B shows gate drive signals for driving switching elements composing a single-phase inverter in the power conversion device according to embodiment 1.

FIG. 5B shows gate drive signals outputted to the switching elements in order to output the voltage waveform corresponding to the output voltage command value (U phase) for the single-phase inverter 40. In FIG. 5B, from the upper side, the waveforms of the output voltage command value and a carrier wave (U phase) for the single-phase inverter 40, and the gate drive signals for driving the switching elements Q13 to Q16 composing the inverter for U phase of the single-phase inverter 40, are shown. Each of the switching elements Q13 to Q16 is switched ON and OFF a plurality of times per cycle. Since the number of times of switching is large in the switching elements composing the single-phase inverter 40 which performs PWM operation, semiconductor elements suitable for high-frequency driving, such as SiC-MOSFET, in which switching loss is small, are used. In this case, in a period in which the gate drive signal is OFF (i.e., 0), the application voltage between the collector and the emitter of the semiconductor element becomes a voltage value of the capacitor 41, and in a period in which the gate drive signal is ON (i.e., 1), the application voltage becomes 0 (in actuality, voltage corresponding to internal voltage drop is applied).

In a case where the voltage of each capacitor 41 of the single-phase inverter 40 is set to be smaller than the voltages of the P-side capacitor 31 and the N-side capacitor 32 which are input capacitors of the three-phase three-level inverter 30, e.g., set to ½ or ⅓ thereof, voltage applied to each switching element composing the single-phase inverter 40 becomes ½ or ⅓ of voltage applied to each switching element composing the three-phase three-level inverter 30. That is, depending on for which inverter the switching elements are used, application voltages thereto are different. Also in a case other than a three-phase power conversion device, application voltages can be made different among a plurality of semiconductor elements by changing the step width of output phase voltage of each inverter.

Next, the relationship between a single-event failure of a semiconductor element due to neutron beams and voltage applied to the semiconductor element will be described.

A single event burnout (SEB) phenomenon in which a semiconductor element is broken by neutron beams coming from space is caused such that, for example, in a Si-IGBT with voltage applied between the collector and the emitter thereof, a neutron beam collides with a Si atom or the like composing the Si-IGBT, and thus the dielectric strength of the Si-IGBT is reduced. If the dielectric strength of the Si-IGBT is reduced, the original withstand voltage cannot be ensured, or overcurrent flows, leading to element breakage. A failure due to the SEB phenomenon occurs with a probability, and since the failure probability increases in proportion to the neutron beam amount, it is known that, as the altitude becomes higher, the failure probability increases. As an index representing tolerance for a single-event failure caused by the SEB phenomenon, there is long term DC stability (LTDS), and the failure probability of a semiconductor element can be described using LTDS.

According to Non-Patent Document 1, the failure probability of a semiconductor element due to the SEB phenomenon tends to decrease when voltage applied to the semiconductor element is reduced. Between the semiconductor elements of the same type, it is obvious that the failure probability of the semiconductor element having higher withstand voltage is lower than the failure probability of the semiconductor element having lower withstand voltage. The inventors have organized such a relationship using FIG. 6A and FIG. 6B.

Figure 6A:
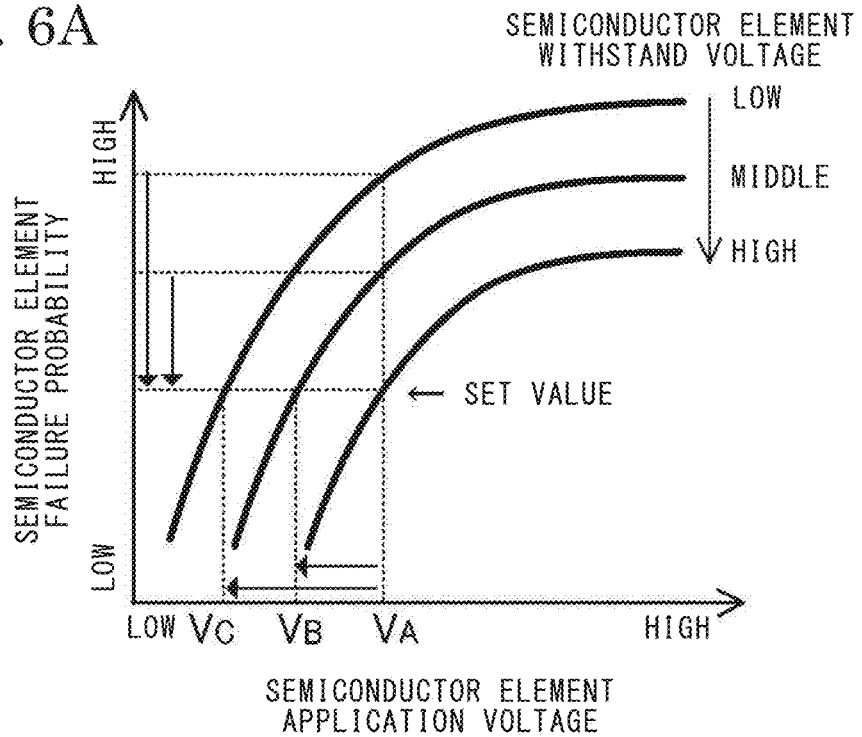
FIG. 6A shows the relationship between a failure probability and application voltage to a semiconductor element, about semiconductor elements having different element withstand voltages.

FIG. 6A schematically shows the relationship between application voltage to a semiconductor element and a failure probability due to a SEB phenomenon, about the same type of semiconductor elements having different element withstand voltages. In a case where the elements of the same type have different withstand voltages that are low, middle, and high, for example, when the semiconductor element application voltage is $V_A$, the failure probability increases as the semiconductor withstand voltage becomes lower. In addition, according to the LTDS characteristics of these semiconductors, the failure probability exponentially decreases as the application voltage is reduced. That is, in a case where operation voltage (application voltage) is the same among the same type of semiconductor elements having different semiconductor element withstand voltages or breakdown voltages, the failure probability of the semiconductor element is inversely proportional to the element withstand voltage or the breakdown voltage.

In FIG. 6A, the failure probability of the element having high semiconductor element withstand voltage is used as a set value, and when the application voltage of the element having high semiconductor element withstand voltage is $V_A$, if the element having middle semiconductor element withstand voltage is driven at the same application voltage $V_A$, the failure probability thereof becomes larger. However, if the application voltage of the element having middle semiconductor element withstand voltage is stepped down to $V_B$, the failure probability thereof can be adjusted to the set value. That is, the failure probabilities of both elements can be made equivalent. Similarly, if the application voltage of the element having low semiconductor element withstand voltage is stepped down from $V_A$ to $V_C$, the failure probability thereof can be adjusted to the set value.

Figure 6B:
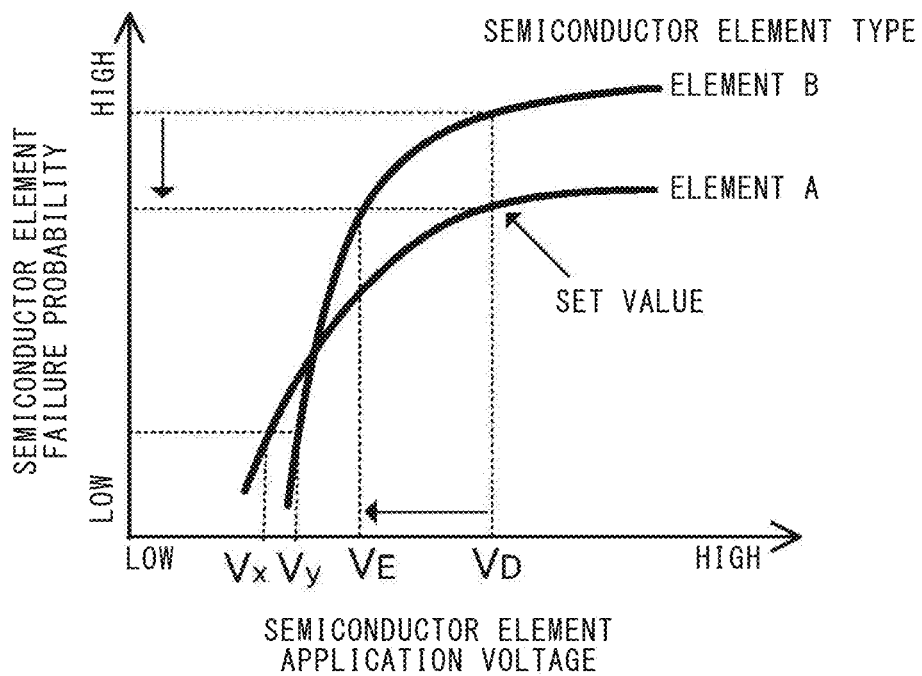
FIG. 6B shows the relationship between a failure probability and application voltage to a semiconductor element, about different types of semiconductor elements.

FIG. 6B schematically shows the relationship between application voltage to a semiconductor element and a failure probability due to SEB, about different types of semiconductor elements having the same withstand voltage (element withstand voltages are equal but breakdown voltages may not necessarily be equal). Different types are, for example, an IGBT and a MOSFET. In FIG. 6B, when the semiconductor element application voltage is $V_D$, the semiconductor failure probability due to a SEB phenomenon is higher in an element B than in an element A. When the failure probability of the element A is used as a set value, if the application voltage of the element B is stepped down from $V_D$ to $V_E$, the failure probability thereof can be adjusted to the set value. Meanwhile, when the application voltage of the element B is $V_y$, if the application voltage of the element A is set to $V_x$, the failure probabilities of both elements can be adjusted to be equivalent.

Here, the element withstand voltage of a semiconductor element represents a voltage upper limit value tolerable between the collector and the emitter of the IGBT (or between the drain and the source of the MOSFET), for example, and this value is determined by each manufacturer. If voltage exceeding a value limited by the element withstand voltage of the semiconductor element is applied, the element reaches a breakdown voltage region and thus causes abnormal heat generation, leading to breakage. The voltage at this time is called breakdown voltage. The breakdown voltage is determined on an element basis (the breakdown voltage may differ due to product variations even among the same elements).

From the above knowledge, an adjustment method for the failure probabilities of the semiconductor elements composing the inverter 10 in the present embodiment will be described.

As described above, voltage applied to each switching element composing the single-phase inverter 40 is, for example, ½ or ⅓ of voltage applied to each switching element composing the three-phase three-level inverter 30, on the basis of a set ratio. For the switching elements composing the three-phase three-level inverter 30, as described above, the application voltage is high and therefore semiconductor elements having high element withstand voltage are used, and for the switching elements composing the single-phase inverter 40, semiconductor elements having middle or low application voltage are used. At this time, in accordance with FIG. 6A and FIG. 6B, the element withstand voltages and the application voltages are set so that the failure probabilities with respect to application voltages for both inverters become equivalent or close to each other.

In a case where, in terms of switching frequency, different types of semiconductor elements are used between the switching elements composing the three-phase three-level inverter 30 and the switching elements composing the single-phase inverter 40 as described above, in accordance with FIG. 6B, the element types and the application voltages are set so that the failure probabilities with respect to the application voltages for both inverters become equivalent or close to each other.

In a power conversion device including a plurality of semiconductor elements, for example, even if elements having a significantly low failure probability are partially used, their advantages cannot be utilized, and measures such as using products having excessively high withstand voltage are needed for ensuring reliability in the entire device, leading to size increase, weight increase, and cost increase of the device. In the present embodiment, the failure probabilities of the semiconductor elements composing the power conversion device are set to be equivalent or close to each other, whereby reliability can be ensured while size increase, weight increase, and cost increase of the device can be suppressed.

The operation of the inverter 10, the adjustment method for the failure probabilities of the semiconductor elements composing the inverter 10, and the like have been described on the basis of the configuration shown in FIG. 2A. The same applies to the example in which the switching elements Q13 to Q24 composing the single-phase inverter 40 are formed by connecting diodes in antiparallel to the HEMTs which are semiconductor elements as shown in FIG. 2B, and the description thereof is omitted.

As described above, according to embodiment 1, as a power conversion device used in an environment subjected to the influence of neutron beams as in aircraft application or the like, the power conversion device 3 is configured using a plurality of semiconductor elements, and voltages applied to the semiconductor elements, the withstand voltages (element withstand voltages or breakdown voltages) of the semiconductor elements, and the element types are adjusted so that the failure probabilities of the plurality of semiconductor elements become equivalent. Thus, it is possible to ensure reliability while suppressing size increase, weight increase, and cost increase of the device.

That is, to the plurality of semiconductor elements used in the power conversion device according to embodiment 1, voltages are respectively applied on the basis of drive signals generated by the control device. The plurality of semiconductor elements are prepared so as to include elements for which failure probabilities due to neutron beams are different when the same voltage is applied thereto, and are adjusted so that the failure probabilities when voltages generated on the basis of the drive signals are applied to the semiconductor elements become equivalent.

The power conversion device of embodiment 1 includes the inverter 10 including the three-phase three-level inverter 30 and the single-phase inverter 40, and the control device 20 for performing drive control of the inverter 10, semiconductor elements having high withstand voltage are used for the switching elements composing the three-phase three-level inverter 30, semiconductor elements formed of a wide bandgap semiconductor are used for the switching elements composing the single-phase inverter 40, and the failure probabilities of the semiconductor elements are adjusted to be equivalent. Thus, in addition to the above-described effects, loss due to driving of the switching elements is reduced, whereby a power conversion device having high efficiency can be provided.

In adjustment for making the failure probabilities equivalent, as a matter of course, it is desirable that the withstand voltages, the application voltages, and the like are adjusted so as to match the failure probabilities to the element having low failure probability.

Being equivalent is not limited to a case of completely coinciding with each other, but includes also a case of being slightly different as long as the same effects are provided.

Embodiment 2

Hereinafter, a power conversion device according to embodiment 2 will be described with reference to the drawings.

Figure 7:
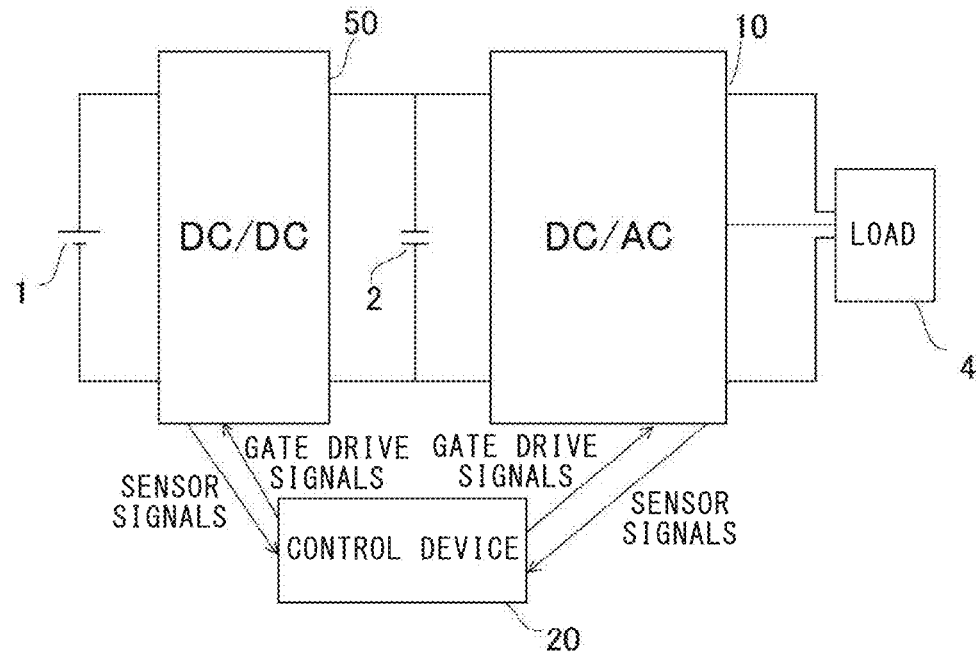
FIG. 7 is a schematic configuration diagram showing the configuration of a power conversion system according to embodiment 2.

FIG. 7 is a schematic configuration diagram showing the configuration of the power conversion system according to embodiment 2. Difference from FIG. 1 in embodiment 1 is that a DC/DC converter 50 for adjusting power supply voltage is provided between the power supply 1 and the DC link capacitor 2. In embodiment 1, input voltage to the connected DC/AC inverter 10, i.e., voltage applied to each switching element is based on the voltage of the power supply 1. However, in a period around takeoff of an aircraft, the altitude is raised while the power conversion device is operated. Therefore, near 0 m above sea level before takeoff, the failure probability due to a SEB phenomenon increases as the altitude is raised. If the input voltage to the DC/AC inverter 10 is constant, it is difficult to reduce the failure probability of a semiconductor element while the altitude is raised. Therefore, the configuration is made such that voltages applied to the switching elements are variable and the application voltages can be controlled, whereby the failure probabilities of the semiconductor elements can be adjusted.

Figure 8:
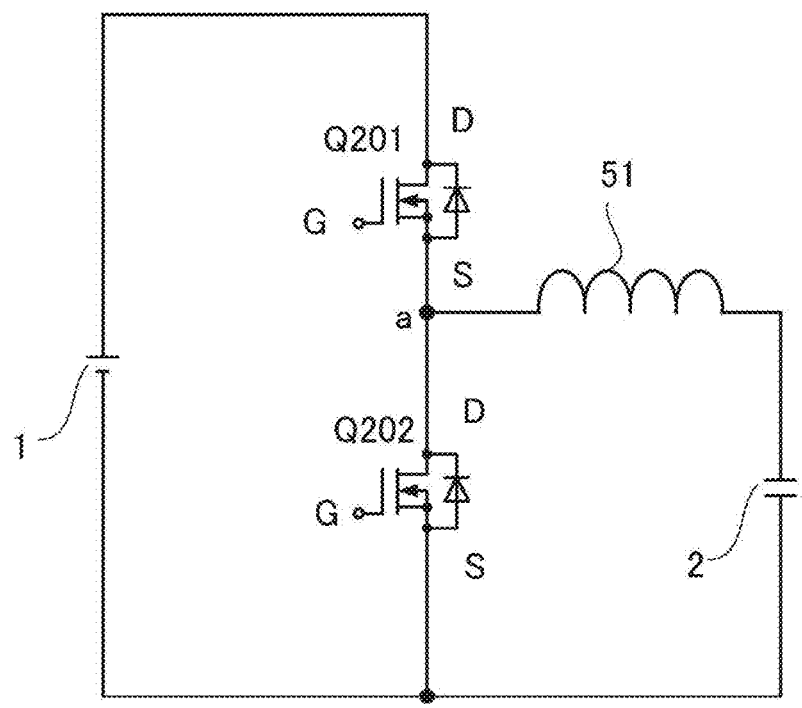
FIG. 8 shows an example of a circuit configuration of a non-isolated step-down chopper circuit according to embodiment 2.

FIG. 8 shows an example of a circuit configuration of a non-isolated step-down chopper circuit as an example of the DC/DC converter 50 according to embodiment 2. In FIG. 8, the non-isolated step-down chopper circuit includes a switching element Q201 and a switching element Q202 connected in series, and a DC reactor 51 having an end connected to a connection point a between the switching element Q201 and the switching element Q202. As shown in FIG. 3B, the switching elements Q201, Q202 are each composed of a SiC-MOSFET 15 and a diode connected in antiparallel thereto.

Figure 9A:
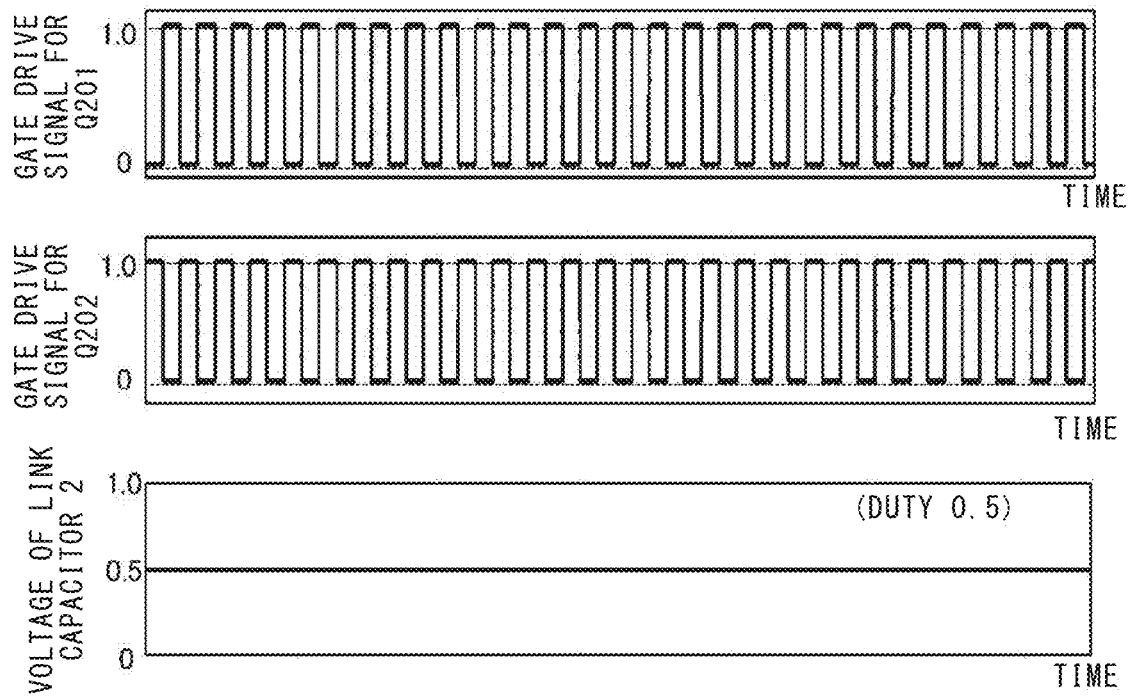
FIG. 9A shows gate drive signals for switching elements composing the non-isolated step-down chopper circuit and voltage of a link capacitor, according to embodiment 2.
Figure 9B:
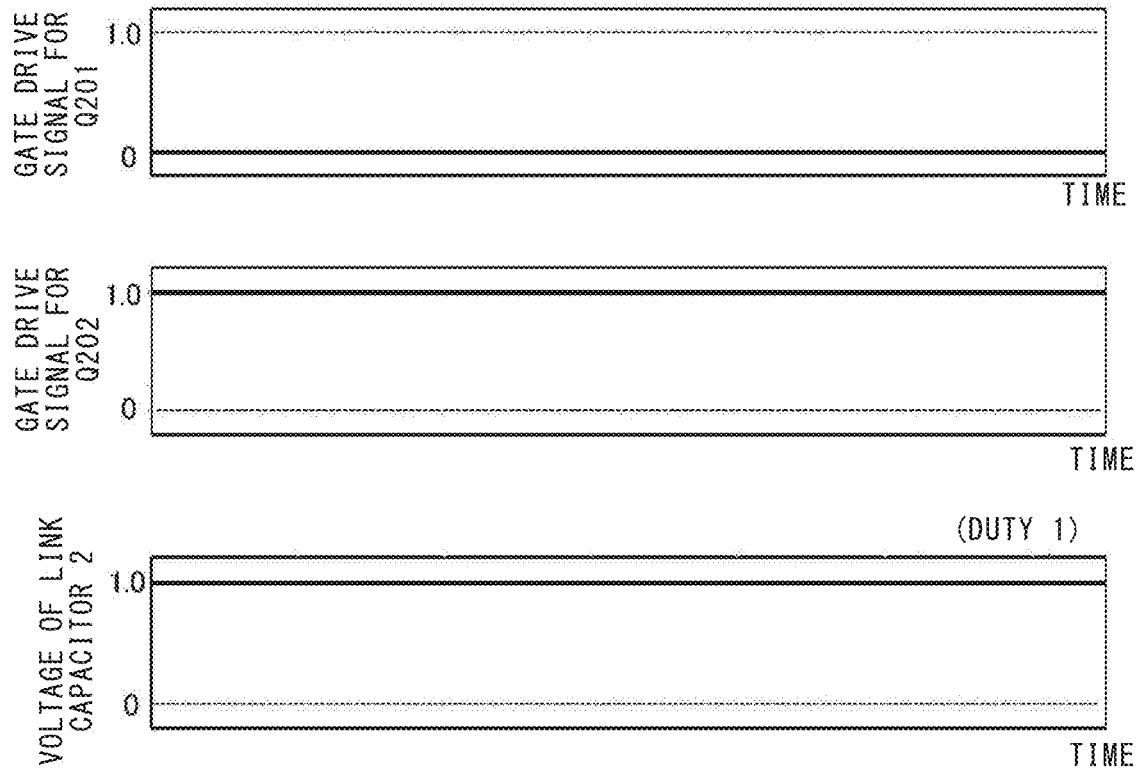
FIG. 9B shows another example of gate drive signals for the switching elements composing the non-isolated step-down chopper circuit and voltage of the link capacitor, according to embodiment 2.

FIG. 9A and FIG. 9B show application voltages (drive signals) of the switching elements of the DC/DC converter 50 which is the non-isolated step-down chopper circuit, and voltage of the DC link capacitor 2. As shown in FIG. 9A, if the conduction ratios of the switching elements Q201, Q202 are 50%, the voltage of the DC link capacitor 2 is stepped down to half the input voltage. As shown in FIG. 9B, if the conduction ratio of the switching element Q201 is 100% and the conduction ratio of the switching element Q202 is 0%, the voltage of the DC link capacitor 2 becomes equal to the input voltage, i.e., voltage of the power supply 1.

In this way, in accordance with the conduction ratios of gate voltages for driving the switching elements Q201, Q202, the voltage applied to the DC link capacitor 2 can be adjusted as follows:

DC link capacitor voltage=input voltage×conduction ratio of switching element Q201.

Since voltages equal to the power supply voltage are applied to the switching elements Q201, Q202 of the DC/DC converter 50, the withstand voltages or the breakdown voltages of semiconductor elements composing these switching elements need to be higher than those of semiconductor elements composing the switching elements of the inverter 10. Since the withstand voltages of multiple (twenty-four) semiconductor elements composing the switching elements of the inverter 10 can be lowered, the weight of the entire device can be reduced.

By adjusting the conduction ratios of the switching elements Q201, Q202 of the DC/DC converter 50 which is the non-isolated step-down chopper as described above, the application voltage to the semiconductor elements composing the inverter 10 can be changed, and as the altitude is raised, the application voltages are lowered, whereby the failure probabilities can be adjusted to be reduced and the failure probabilities of the plurality of semiconductor elements can be adjusted to be equivalent. For example, the failure probabilities are set on the basis of the average altitude during cruising in which the operation period of the aircraft is longest. The application voltages are set so that the flight cycle life determined by the failure probabilities under the application voltages and the flight period set for each aircraft satisfies a predetermined life.

As described above, according to embodiment 2, the DC/DC converter 50 for adjusting voltage of the DC link capacitor 2 so as to be reduced is further provided. Thus, although the failure probability increases as the altitude is raised under the same application voltage, it is possible to reduce the failure probability by reducing the application voltage. If the application voltage is adjusted as in embodiment 1 on the basis of reduced voltage of the DC link capacitor 2, the failure probabilities of the plurality of semiconductor elements composing the power conversion device can be adjusted to be equivalent, whereby reliability of the power device can be ensured.

Embodiment 3

Hereinafter, a power conversion device according to embodiment 3 will be described.

The semiconductor elements composing the switching elements are each formed by connecting a diode in antiparallel to a transistor such as IGBT, MOSFET, or HEMT as shown in FIG. 3A to FIG. 3C. In the example in which the SiC-diode is connected in antiparallel to the SiC-MOSFET in FIG. 3B, a failure probability due to SEB differs between these two semiconductor elements in a case of having the same withstand voltage. Since the same voltage is applied to one switching element, the semiconductor element having a higher failure probability becomes a bottleneck with respect to the failure. Accordingly, the withstand voltage or the breakdown voltage of the semiconductor element having a higher failure probability is set to be greater than the withstand voltage or the breakdown voltage of the semiconductor element having a lower failure probability. Thus, in consideration of FIG. 6A and FIG. 6B, the failure probability can be made equivalent or close to each other with respect to the same application voltage, whereby reliability of the power conversion device can be ensured.

Embodiment 4

Hereinafter, a power conversion device according to embodiment 4 will be described.

In embodiments 1 to 3, as shown in FIG. 2A and FIG. 2B, it has been described that a Si-IGBT is preferable for the switching elements of the three-phase three-level inverter 30, and a SiC-MOSFET or a GaN-HEMT is preferable for the switching elements of the single-phase inverter 40. However, arbitrary selection different from the above combinations may be adopted. The way of consideration in a case of using different types of semiconductor elements will be described below.

FIG. 6b) in Non-Patent Document 1 shows failure probabilities of a SiC-MOSFET and a Si-IGBT both having withstand voltage of 1.7 kV. At application voltage (bias) of 1000 V, the failure probability of the Si-IGBT is greater than the failure probability of the SiC-MOSFET. However, as the application voltage is reduced, the relationship is reversed at a border of about 870 V, so that the failure probability of the Si-IGBT becomes smaller than the failure probability of the SiC-MOSFET.

Between different types of elements having the same withstand voltage, the element having a higher failure probability becomes a bottleneck. Therefore, the withstand voltage or the breakdown voltage of the semiconductor element having a higher failure probability is set to be greater than the withstand voltage or the breakdown voltage of the semiconductor element having a lower failure probability. Thus, in consideration of FIG. 6A and FIG. 6B, the failure probabilities can be made equivalent or close to each other with respect to the same application voltage, whereby reliability of the power conversion device can be ensured. On the basis of such a way of consideration, the types of semiconductor elements can be changed for the switching elements to which the same voltage is applied.

Meanwhile, in embodiments 1 to 3, in the configuration shown in FIG. 2A, in a case where a Si-IGBT is used for the switching elements of the three-phase three-level inverter 30 and a SiC-MOSFET is used for the switching elements of the single-phase inverter 40, it is considered preferable that the application voltage to the SiC-MOSFET of each switching element of the single-phase inverter 40 is lower by ½ to ⅓ than the application voltage to the Si-IGBT of each switching element of the three-phase three-level inverter 30.

Figure 10:
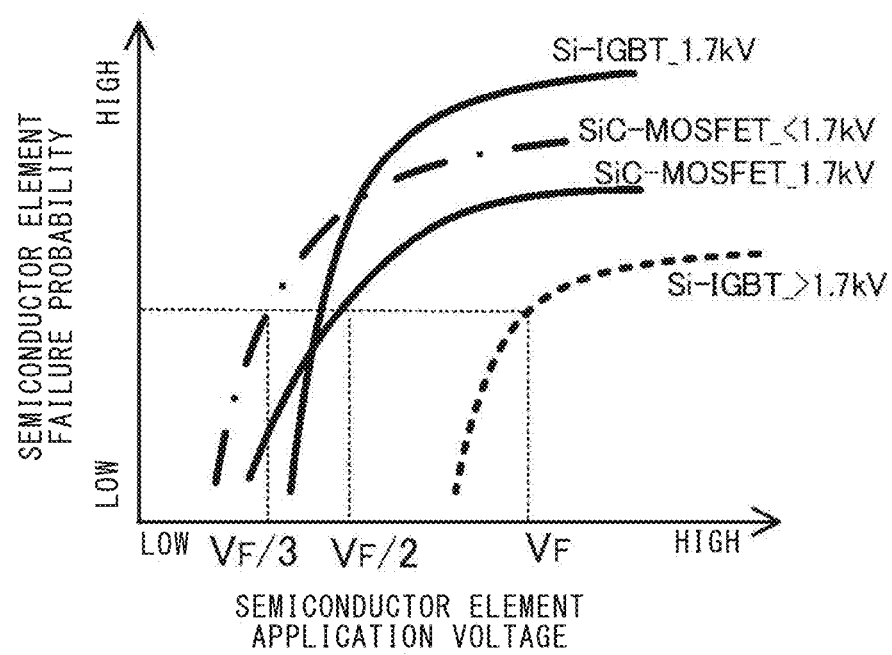
FIG. 10 illustrates how to match failure probabilities of different types of semiconductor elements in a power conversion device according to embodiment 4.

FIG. 10 schematically shows the failure probabilities of the SiC-MOSFET and the Si-IGBT having withstand voltage of 1.7 kV shown in FIG. 6b) of Non-Patent Document 1 described above. Solid lines are curves of the failure probabilities of the SiC-MOSFET and the Si-IGBT having withstand voltage of 1.7 kV. For the elements having this withstand voltage, it is impossible to apply, to the SiC-MOSFET, application voltage lower by ½ to ⅓ than the Si-IGBT, at any application voltages. A curve of the failure probability of the Si-IGBT whose withstand voltage is set to be greater is indicated by a dotted line (Si-IGBT_>1.7 kV). As shown in the graph, when the application voltage to the Si-IGBT is $V_F$, if voltage of $V_F/2$ is applied to the SiC-MOSFET having withstand voltage of 1.7 kV, the failure probabilities become equivalent. Further, since it is known that the application voltage to the SiC-MOSFET is smaller than the application voltage to the Si-IGBT, the SiC-MOSFET having reduced withstand voltage may be used. In FIG. 10, a dotted-dashed line is a curve of the failure probability of the SiC-MOSFET having withstand voltage smaller than 1.7 kV (SiC-MOSFET_<1.7 kV). In this case, it is possible to make setting such that voltage of $V_F/3$ is applied and the failure probabilities become equivalent.

As described above, according to embodiment 4, for different types of semiconductor elements, the withstand voltage or the breakdown voltage of the semiconductor element having a higher failure probability is set to be greater than the withstand voltage or the breakdown voltage of the semiconductor element having a lower failure probability, so that the failure probabilities become equivalent or close to each other. Thus, reliability of the power conversion device can be ensured.

Embodiment 5

Hereinafter, an aircraft according to embodiment 5 will be described.

Figure 11:
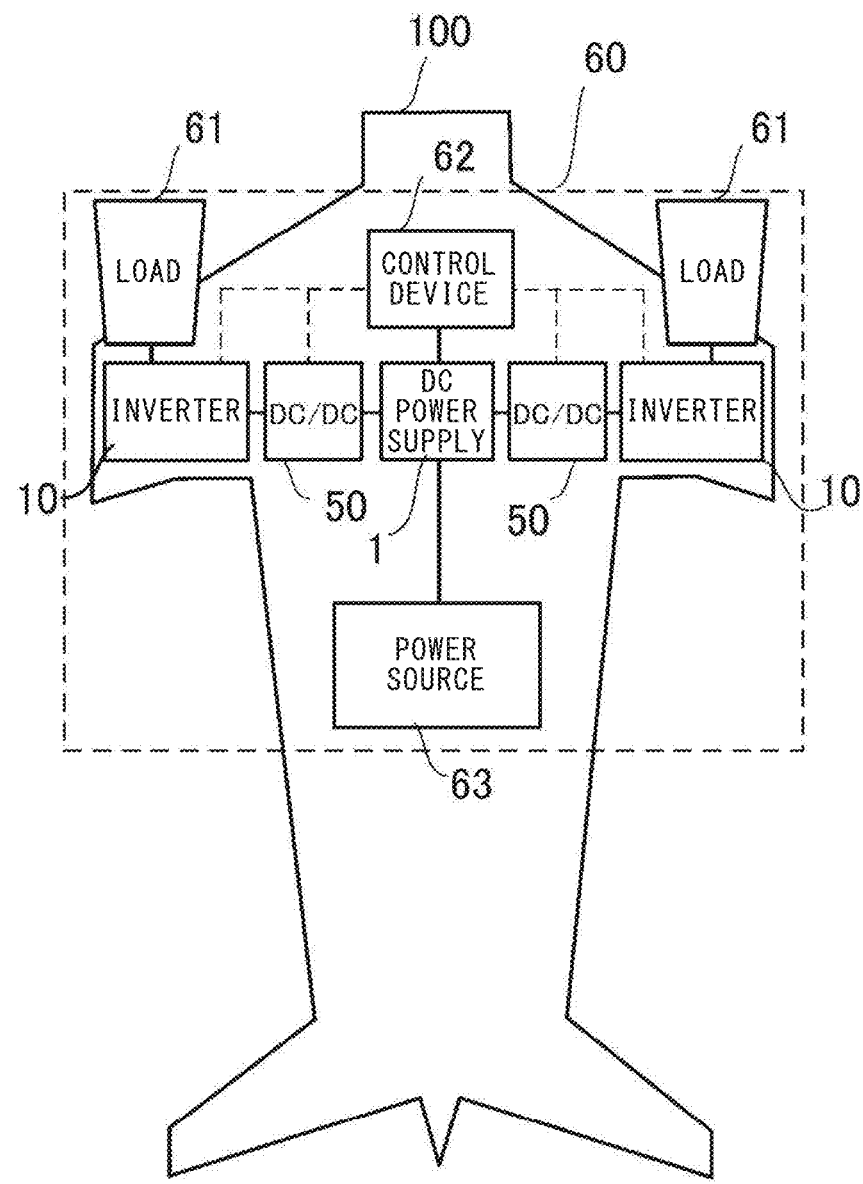
FIG. 11 is a schematic configuration diagram showing an aircraft according to embodiment 5.

FIG. 11 shows an example of an aircraft 100 according to embodiment 5, and is a block diagram showing a state in which the power conversion device described in each of embodiments 1 to 4 is mounted. The aircraft 100 is an electric aircraft, and includes, as a propulsion-related power system 60, a power source 63, the power supply (DC power supply) 1 connected to the power source 63, the DC/DC converters 50 connected to the power supply 1 and including step-down chopper circuits for performing conversion to predetermined voltage, the inverters 10 for converting DC powers stepped down by the DC/DC converters 50 to AC powers, loads 61 supplied with powers from the inverters 10, and a control device 62 for controlling the DC/DC converters 50 and the inverters 10. Here, the loads 61 are propulsion-related loads for obtaining propulsion force, and are, for example, electric motors.

The power conversion device of each of embodiments 1 to 4 is used as the inverters 10 and the DC/DC converters 50 for electric aircraft in the propulsion-related power system 60 mounted to the aircraft 100. Since the neutron beam amount increases in proportion to the altitude, in a case of mounting a conventional power conversion device to an object flying in the sky, such as an aircraft, the failure probability increases as compared to a case of usage on the ground. By mounting the propulsion-related power system 60 including the power conversion device described in each of embodiments 1 to 4 for which a failure due to neutron beams is taken into consideration, the failure probabilities of the semiconductor elements used in the inverters 10 for electric aircraft and the DC/DC converters 50 for electric aircraft can be reduced, and the failure probabilities of the semiconductor elements can be made equivalent, whereby reliability can be ensured while size increase, weight increase, and cost increase of the device can be suppressed. Thus, fuel efficiency of the electric aircraft is also improved.

Embodiment 6

Hereinafter, an aircraft according to embodiment 6 will be described.

Figure 12:
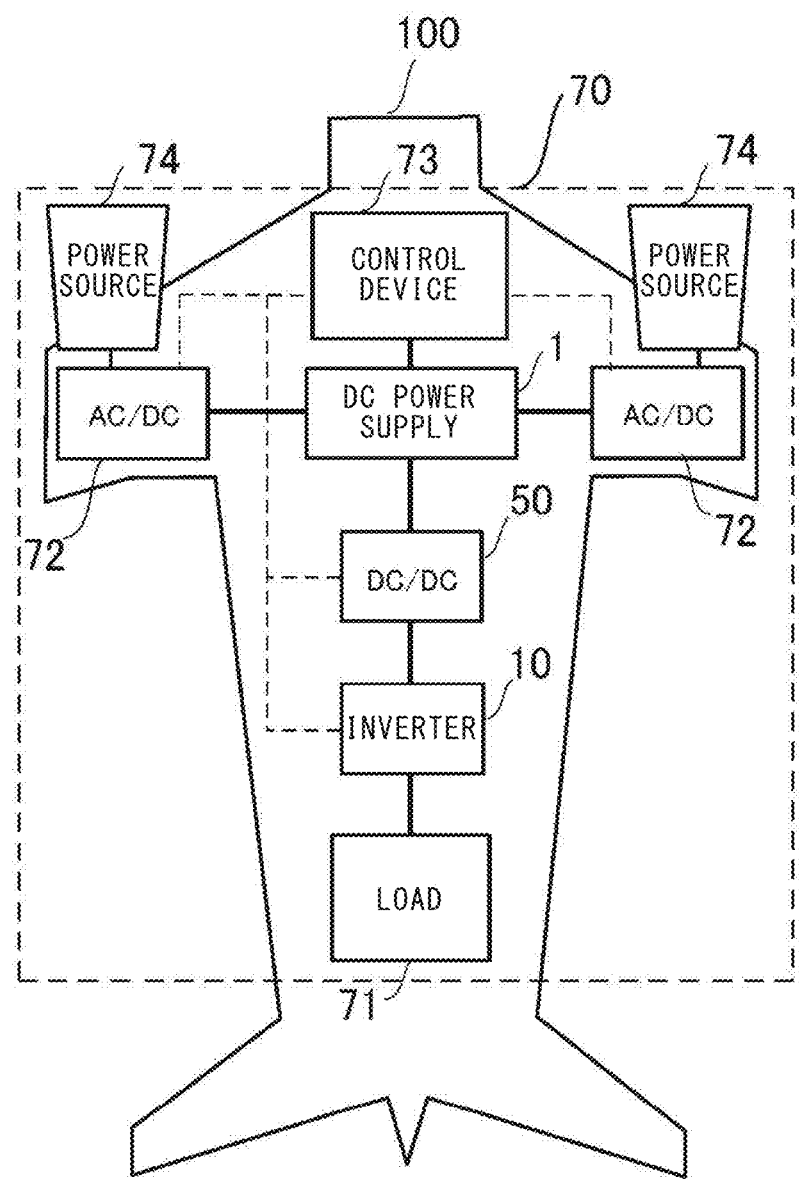
FIG. 12 is a schematic configuration diagram showing an aircraft according to embodiment 6.

FIG. 12 shows an example of an aircraft 100 according to embodiment 6, and is a block diagram showing a state in which the power conversion device described in each of embodiments 1 to 4 is mounted. The aircraft 100 is an electric aircraft, and includes, as an equipment-related power system 70, power sources 74, AC/DC converters 72 which are connected to the power sources 74 and convert AC powers to DC powers, the power supply (DC power supply) 1 connected to the AC/DC converters 72, the DC/DC converter 50 connected to the power supply 1 and including a step-down chopper circuit for performing conversion to predetermined voltage, the inverter 10 for converting DC power stepped down by the DC/DC converter 50 to AC power, a load 71 supplied with power from the inverter 10, and a control device 73 for controlling the DC/DC converter 50, the inverter 10, and the AC/DC converters 72. Here, the load 71 is an equipment-related load, and is, for example, an electric motor or the like used for driving an air conditioning device, an engine starter, or an auxiliary power device.

As in embodiment 5, the power conversion device of each of embodiments 1 to 4 is used as the inverter 10 and the DC/DC converter 50 for electric aircraft in the equipment-related power system 70 mounted to the aircraft 100. Since the neutron beam amount increases in proportion to the altitude, in a case of mounting a conventional power conversion device to an object flying in the sky, such as an aircraft, the failure probability increases as compared to a case of usage on the ground. By mounting the equipment-related power system 70 including the power conversion device described in each of embodiments 1 to 4 for which a failure due to neutron beams is taken into consideration, the same effects as in embodiment 5 are provided.

Also for the semiconductor elements of the switching elements used in the AC/DC converters 72, element designing may be made so that the failure probabilities become equivalent as described in embodiments 1 to 4, whereby the failure probabilities of the AC/DC converters 72 can be reduced, and reliability can be ensured while size increase, weight increase, and cost increase of the device can be suppressed.

In a case of providing a plurality of power conversion devices as in the aircrafts according to embodiments 5 and 6, it is desirable to perform designing so as to make the failure probabilities of the semiconductor elements equivalent between the power conversion devices.

Figure 13:
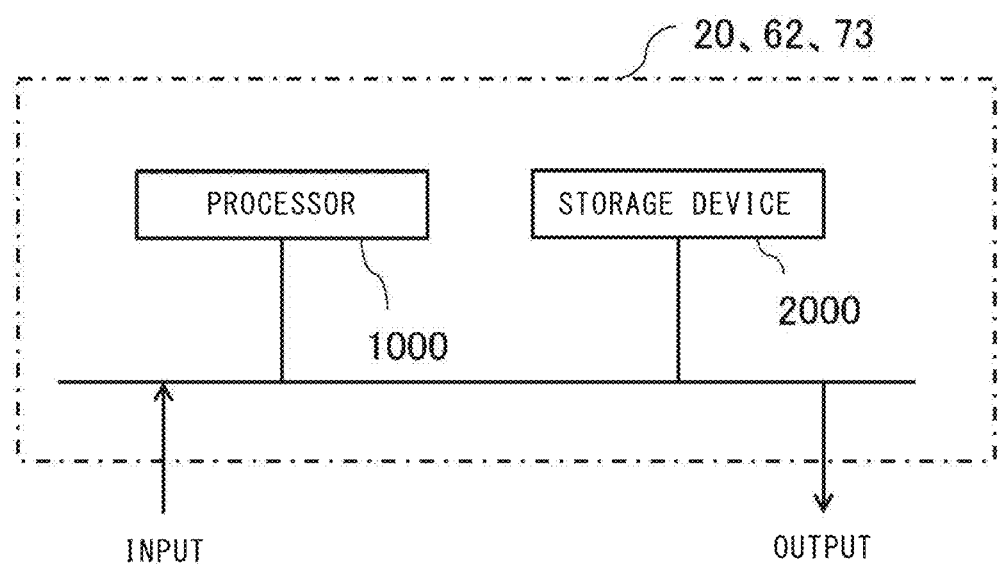
FIG. 13 is a hardware configuration diagram of a control device according to each of embodiments 1 to 6.

As shown in FIG. 13 which shows a hardware example, the control devices 20, 62, 73 are each composed of a processor 1000 and a storage device 2000. Although not shown, the storage device is provided with a volatile storage device such as a random access memory, and a nonvolatile auxiliary storage device such as a flash memory. Instead of the flash memory, an auxiliary storage device of a hard disk may be provided. The processor 1000 executes a program inputted from the storage device 2000. In this case, the program is inputted from the auxiliary storage device to the processor 1000 via the volatile storage device. The processor 1000 may output data such as a calculation result to the volatile storage device of the storage device 2000, or may store such data into the auxiliary storage device via the volatile storage device.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 power supply
2 DC link capacitor
3 power conversion device
4 load
10 inverter
13 IGBT
14 diode
15 MOSFET
16 diode
17 HEMT
18 diode
20 control device
30 three-phase three-level inverter
31 P-side capacitor
32 N-side capacitor
40 single-phase inverter
41 capacitor
50 DC/DC converter (non-isolated step-down chopper circuit)
51 DC reactor
60 propulsion-related power system
61 load
62 control device
63 power source
70 equipment-related power system
71 load
72 AC/DC converter
73 control device
74 power source
100 aircraft
1000 processor
2000 storage device

The invention claimed is:

1. A power conversion device which is provided between a power supply and a load, and which converts power from the power supply and supplies the converted power to the load, the power conversion device comprising:
a plurality of switching elements each including a semiconductor element to be controlled by a drive signal; and
control circuitry for generating the drive signals, wherein voltages are respectively applied to a plurality of the semiconductor elements, on the basis of the drive signals generated by the control circuitry,
the plurality of semiconductor elements include first and second semiconductor elements for which failure probabilities due to neutron beams are different from each other when the same voltage is applied thereto, and
the voltages different from each other are applied to the first and second semiconductor elements so that the plurality of semiconductor elements have equivalent failure probabilities due to neutron beams with respect to the respective voltages applied thereto on the basis of the drive signals.

2. The power conversion device according to claim 1, wherein
the failure probabilities due to neutron beams, of the plurality of semiconductor elements, are set to be equivalent on the basis of the voltages applied to the semiconductor elements, element withstand voltages or breakdown voltages of the semiconductor elements, and types of the semiconductor elements.

3. The power conversion device according to claim 1, configured as a DC/AC inverter including a three-phase three-level inverter and a single-phase inverter, wherein
the three-phase three-level inverter has three legs which are each formed by connecting four of the switching elements in series and which are connected in parallel to the power supply,
the single-phase inverter has three inverters for respective phases, which are each formed by a bridge circuit of the switching elements, and
intermediate points of the legs of the three-phase three-level inverter are respectively connected to the inverters for the respective phases of the single-phase inverter.

4. The power conversion device according to claim 1, further comprising a voltage conversion circuit for converting voltage of the power supply, wherein
voltage to be applied to the semiconductor elements is reduced by the voltage conversion circuit.

5. The power conversion device according to claim 4, wherein
the voltage conversion circuit is a step-down chopper circuit having the switching elements connected in series, which are connected in parallel to the power supply, the step-down chopper circuit having a reactor connected to an intermediate point between the switching elements connected in series.

6. The power conversion device according to claim 1, wherein
the switching elements each include the semiconductor element that is one of a MOSFET, an IGBT, and a HEMT, and a diode connected in antiparallel thereto, and
the semiconductor element that is one of the MOSFET, the IGBT, and the HEMT, and the diode, composing each one of the switching elements have equivalent failure probabilities due to neutron beams.

7. The power conversion device according to claim 3, wherein
the switching elements provided in the three-phase three-level inverter include the first semiconductor elements, and the first semiconductor elements are formed of a Si semiconductor, and
the switching elements provided in the single-phase inverter include the second semiconductor elements, and the second semiconductor elements are formed of a wide bandgap semiconductor.

8. The power conversion device according to claim 7, wherein
the first semiconductor elements composing the switching elements provided in the three-phase three-level inverter are Si-IGBTs, and
the second semiconductor elements composing the switching elements provided in the single-phase inverter are SiC-MOSFETs or GaN-HEMTs.

9. An aircraft comprising the power conversion device according to claim 1.

10. The power conversion device according to claim 2, configured as a DC/AC inverter including a three-phase three-level inverter and a single-phase inverter, wherein
the three-phase three-level inverter has three legs which are each formed by connecting four of the switching elements in series and which are connected in parallel to the power supply,
the single-phase inverter has three inverters for respective phases, which are each formed by a bridge circuit of the switching elements, and
intermediate points of the legs of the three-phase three-level inverter are respectively connected to the inverters for the respective phases of the single-phase inverter.

11. The power conversion device according to claim 2, further comprising a voltage conversion circuit for converting voltage of the power supply, wherein
voltage to be applied to the semiconductor elements is reduced by the voltage conversion circuit.

12. The power conversion device according to claim 3, further comprising a voltage conversion circuit for converting voltage of the power supply, wherein
voltage to be applied to the semiconductor elements is reduced by the voltage conversion circuit.

13. The power conversion device according to claim 11, wherein
the voltage conversion circuit is a step-down chopper circuit having the switching elements connected in series, which are connected in parallel to the power supply, the step-down chopper circuit having a reactor connected to an intermediate point between the switching elements connected in series.

14. The power conversion device according to claim 12, wherein
the voltage conversion circuit is a step-down chopper circuit having the switching elements connected in series, which are connected in parallel to the power supply, the step-down chopper circuit having a reactor connected to an intermediate point between the switching elements connected in series.

15. The power conversion device according to claim 10, wherein
the switching elements provided in the three-phase three-level inverter include the first semiconductor elements, and the first semiconductor elements are formed of a Si semiconductor, and
the switching elements provided in the single-phase inverter include the second semiconductor elements, and the second semiconductor elements are formed of a wide bandgap semiconductor.

16. The power conversion device according to claim 15, wherein
the first semiconductor elements composing the switching elements provided in the three-phase three-level inverter are Si-IGBTs, and
the second semiconductor elements composing the switching elements provided in the single-phase inverter are SiC-MOSFETs or GaN-HEMTs.

* * * * *